Dec. 5, 1961  E. P. BRINKEL ET AL  3,011,519
FLUID CONTROL DEVICE
Filed Nov. 20, 1959  4 Sheets-Sheet 1
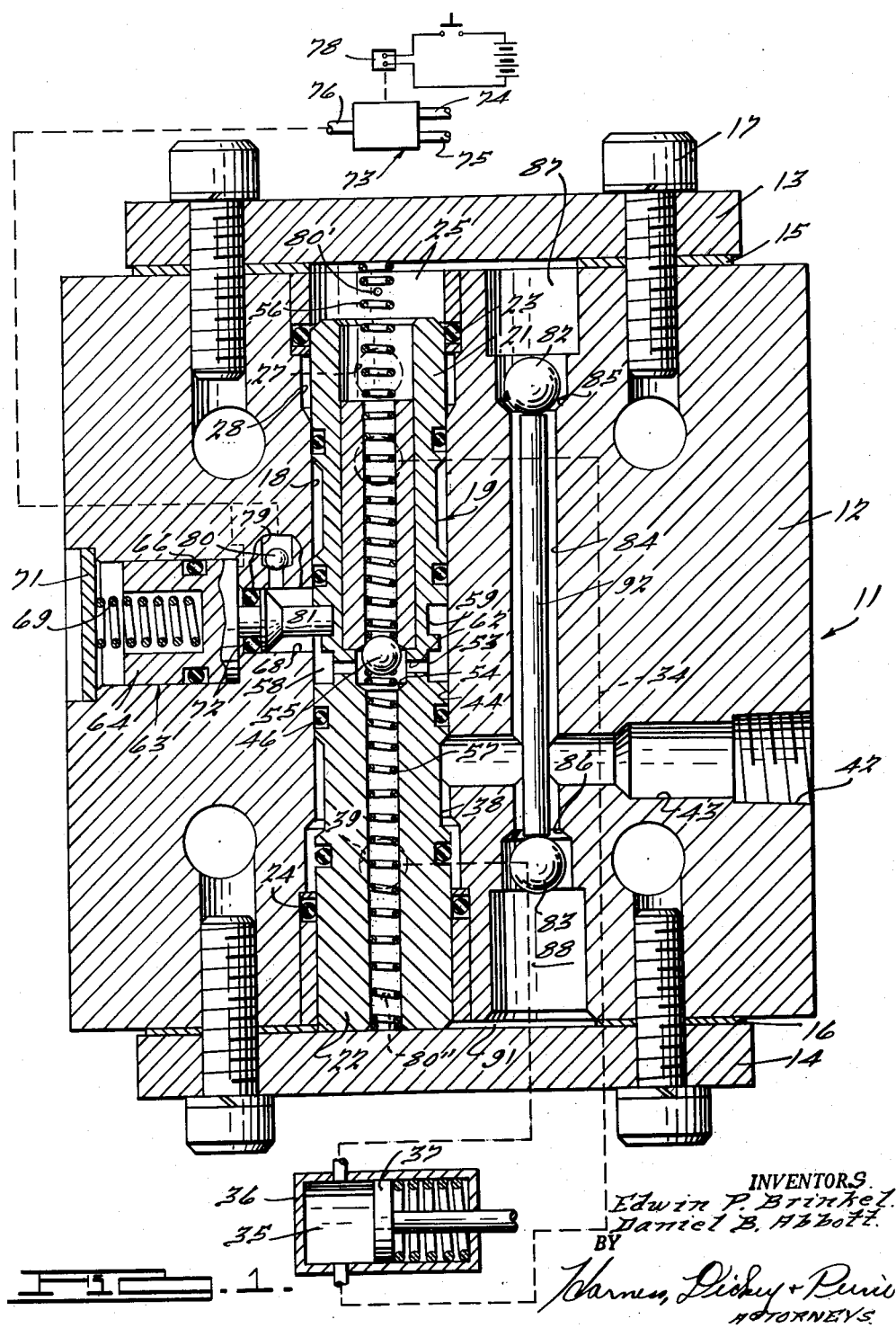
INVENTORS.
Edwin P. Brinkel.
Daniel B. Abbott.
BY
Harness, Dickey & Pierce.
ATTORNEYS

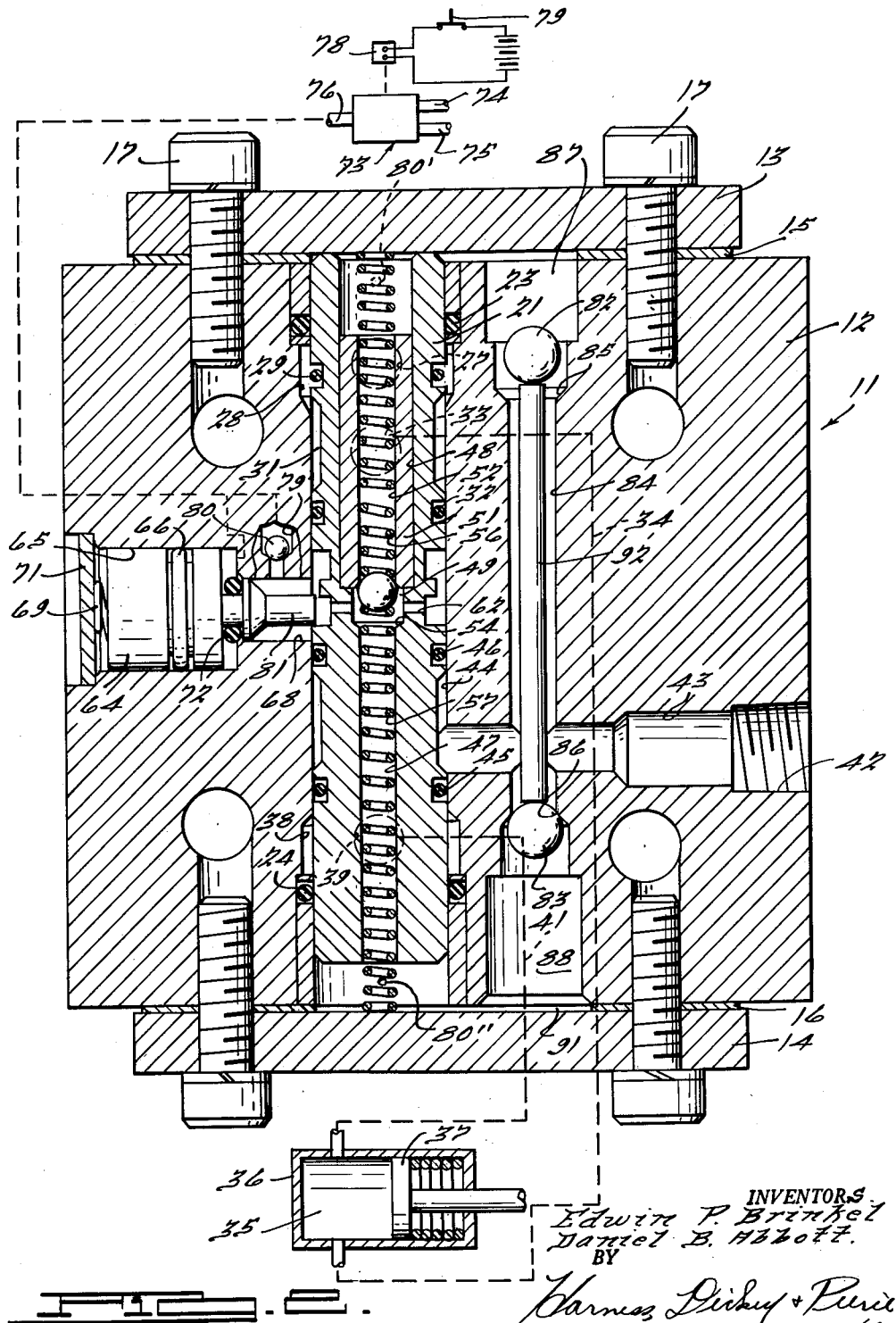

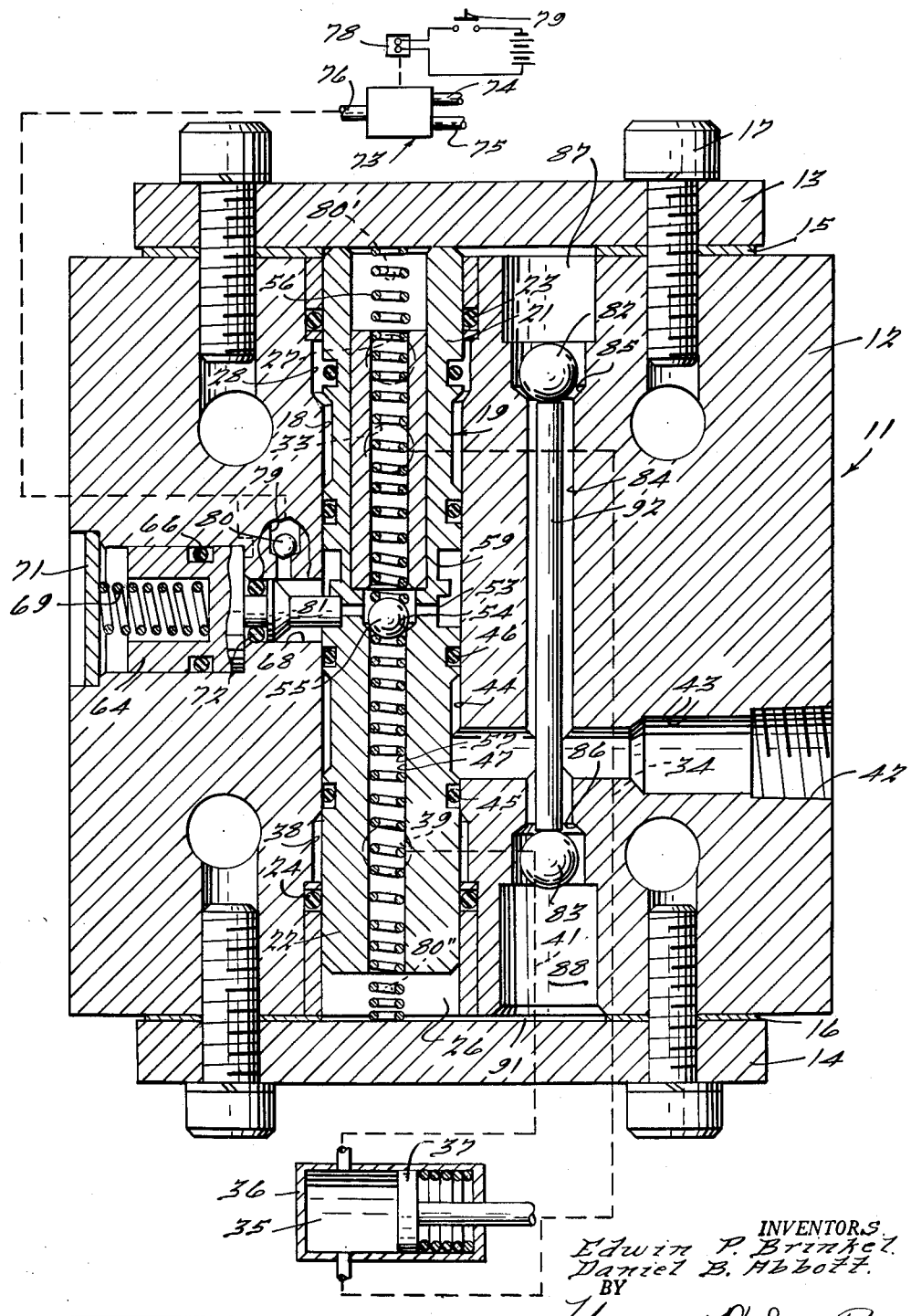

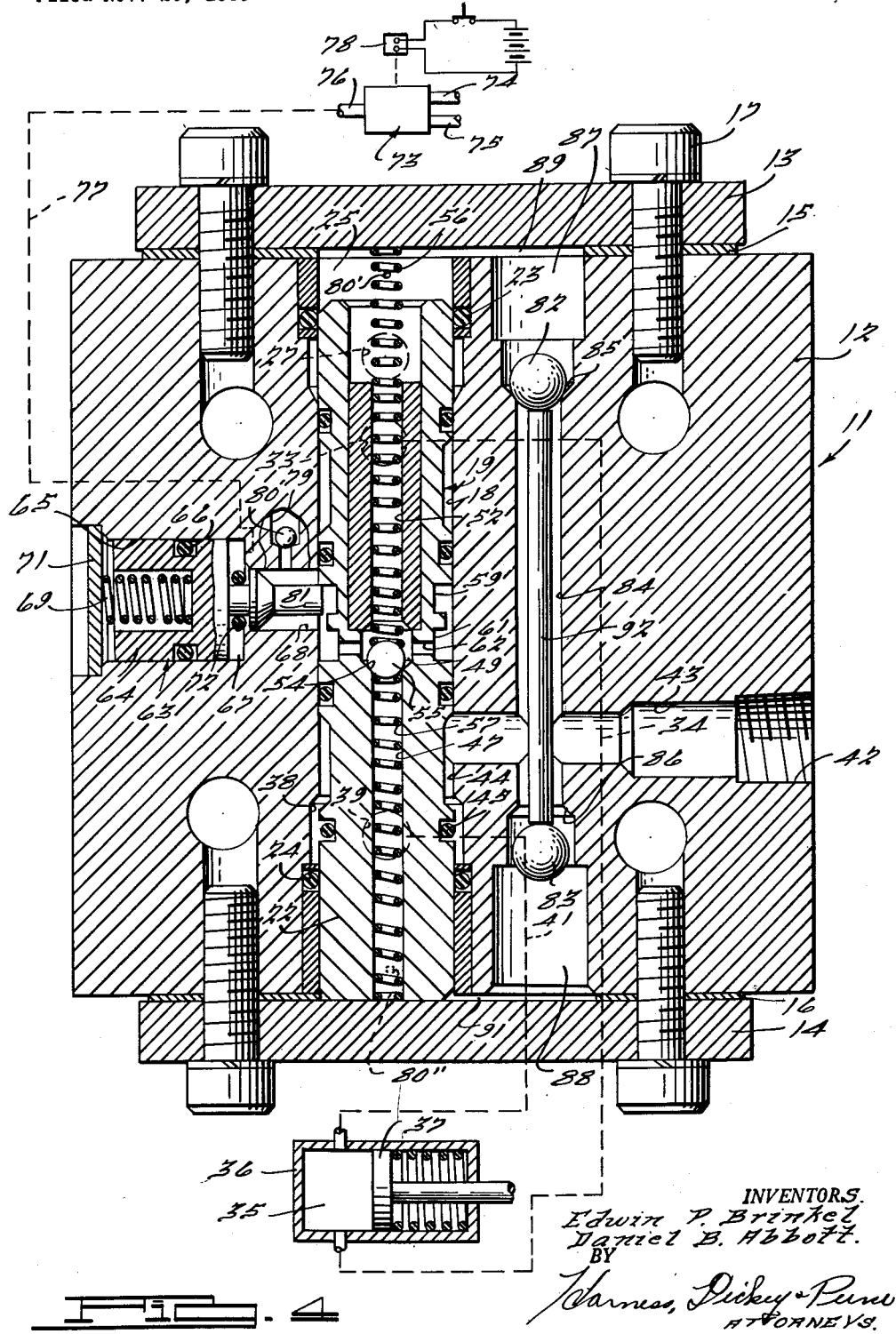

United States Patent Office 3,011,519
Patented Dec. 5, 1961

3,011,519
FLUID CONTROL DEVICE
Edwin P. Brinkel, Royal Oak, and Daniel B. Abbott, Clawson, Mich., assignors to Ross Operating Valve Company, Detroit, Mich., a corporation of Michigan
Filed Nov. 20, 1959, Ser. No. 854,488
17 Claims. (Cl. 137—620)

This application relates to fluid control devices, and more particularly to mechanisms shiftable between two alternate positions in response to successive momentary applications of fluid pressure. This application is related in some respects to Patent No. 2,859,735, issued November 11, 1958, to Di Tirro and Ei, and application Serial Nos. 691,858, and 810,034, filed October 23, 1957, and April 30, 1959, respectively, by Edwin P. Brinkel and assigned to the assignee of the present application, application Serial No. 691,858, having now issued as Patent No. 2,921,602, dated January 19, 1960.

It is an object of the present invention to provide a novel and improved device for controlling movement of a valve or other actuating mechanism between two alternate positions in response to successive momentary applications of fluid pressure, which offers extreme advantages over previously known devices of this type in terms of compactness, economy of construction, improved wearing qualities and general reliability.

It is another object to provide an improved shiftable mechanism of this nature which is adapted for use with either compressible or incompressible fluids and has relatively few moving parts which may require adjustment or replacement.

It is also an object to provide an improved shiftable mechanism of this character in which little or no stress is placed on mechanical components which might result in early malfunction or failure of the mechanism.

Other objects and features of novelty of the invention will be specifically pointed out or otherwise become apparent when referring, for a better understanding of the invention, to the following description taken in conjunction with the accompanying drawings wherein:

FIGURE 1 is a partially schematic cross-sectional view of a preferred form of the improved shiftable mechanism shown as controlling fluid flow to a reciprocating motor, the parts being shown in an initial position;

FIGURE 2 is a view similar to FIGURE 1 showing the parts in first momentarily pressurized condition;

FIGURE 3 is a view similar to FIGURES 1 and 2 showing the actuating spool in its new position after depressurization; and FIGURE 4 is a view similar to the previous figures showing the actuating spool after having been shifted back to its first position upon repressurization.

In general terms, the invention comprises an actuating spool shiftable between two alternate positions, the illustrated embodiment of the invention showing this spool as controlling inlet and exhaust ports of a three-way valve for a reciprocable fluid motor. The spool is shifted by means of two fluid chambers at its opposite ends, and passage of fluid to each chamber is controlled by a shuttle valve disposed centrally within an axial passage extending through the spool. Means in the form of helical compression springs are provided on opposite sides of this shuttle valve and are engageable with the housing ends which form the two chambers in such a manner that the shuttle valve will be urged to close that portion of the passage remote from the housing end toward which the actuating spool has been shifted.

A transverse passage is used to supply fluid to a central chamber in the passage within which the shuttle valve is disposed, and a control valve is provided for alternately supplying pressure to and exhausting it from this central chamber. In the illustrated embodiment of the invention, the control valve operates an intermediate valve movable in a direction transverse to the actuating spool axis, and a detent is connected to the intermediate valve and is movable into locking position with respect to the spool when the intermediate valve is closed. The arrangement is such that this detent will engage the spool only after the intermediate valve has been closed, and will be withdrawn from locking engagement with the spool before the intermediate valve opens to admit pressure to the central chamber. Thus, no substantial lateral force will be placed on the detent at any time.

For instances where incompressible fluids are used, a pair of check valves are connected to the respective end chambers of the actuating spool, these check valves being separated by a spacer and connected to exhaust in a manner such that evacuation of the end chamber toward which the actuating spool is being shifted will be assured. A check valve passage bypassing the intermediate valve and connecting the control chamber and control valve also assures decompression of the proper end chamber when the control valve is moved to exhaust.

Referring more particularly to the drawings, the device is generally indicated at 11 and comprises a housing 12 having end plates 13 and 14 with gaskets 15 and 16, respectively, and held in position by bolts 17. Housing 12 is of generally rectangular shape and has a central bore 18 within which is disposed an actuating spool generally indicated at 19. Spool 19 is somewhat shorter than the space between plates 13 and 14 and has end portions 21 and 22, respectively, slidable within seals 23 and 24 carried by housing 12. The seals form end chambers 25 and 26 adjacent ends 21 and 22, respectively, of the spool.

A constant pressure supply port 27 is provided in housing 12, this port leading to an annular chamber 28 surrounding spool 19 adajacent seal 23. The spool carries a seal 29 movable with the spool between a first position as shown in FIGURE 1 and a second position as shown in FIGURE 2. In FIGURE 1, seal 29 cuts off supply chamber 28 from an annular chamber 31 formed in bore 18 between seal 29 and a seal 32 carried by spool 19. Chamber 31 is connected by a port 33 and a conduit 34 to a chamber 35 of a cylinder motor 36 having a piston 37. In FIGURE 2, chambers 28 and 31 are connected so that port 33 and chamber 35 are pressurized to shift piston 37 to the right.

A chamber 38 is provided in housing 12 adjacent seal 24 and is connected by a port 39 and a conduit 41 to motor chamber 35. An exhaust port 42 is provided in housing 12 and is connected by a lateral passage 43 with a chamber 44 in bore 18 formed by seals 45 and 46 on spool 19. When spool 19 is in the position shown in FIGURE 1, chamber 38 will be connected to chamber 44, so that motor chamber 35 will be connected to exhaust. When spool 19 shifts to the position shown in FIGURE 2, seal 45 will cut off the connection between chambers 38 and 44, so that pressure may be applied from chamber 31 to the motor. It will be understood that spool 19 could be used to control means other than the three-way valve for motor 36 within the principles of the invention. It should also be observed that with the porting arrangement shown for the three-way valve, movement of the seals, which are illustrated as being O-rings, is in accordance with accepted fluid flow principles to prevent undesired distortion or damage to the O-rings. That is, the O-rings will move in the direction of fluid flow when closing and against the direction of fluid flow when opening.

The interior of spool 19 has a first axial bore 47 and a second and larger axial bore 48, these bores being disposed on opposite sides of an enlarged central chamber 49. An insert 51 is disposed within bore 48 and has a central bore 52 of the same diameter as bore 47 connected with chamber 49. Bores 52 and 47 have valve seats 53 and 54 formed adjacent chamber 49, and a spherical shuttle valve member 55 is disposed within chamber 49 and is shiftable into engagement with either valve seat. A long helical compression spring 56 is disposed within bore 52 and is engaged at one end by end plate 13, the other end of this spring engaging valve 55. Another helical compression spring 57 is provided in bore 47 and is disposed between end plate 14 and valve 55. The length of springs 56 and 57 are such that when spool 19 is in the position shown in FIGURE 1, spring 57 will be compressed sufficiently to urge valve 55 against seat 53. When spool 19 is in the position shown in FIGURE 3, spring 57 will be relaxed while spring 56 is compressed, so that shuttle valve 55 will be urged against valve seat 54.

Seals 32 and 46 form a central chamber 58 within bore 18, and spool 19 is provided with a pair of annular locking grooves 59 and 61 within this chamber. A plurality of radial passages 62 extend between chamber 58 and central chamber 49 within groove 61. A detent actuator generally indicated at 63 is provided for moving a detent described below and for controlling fluid flow to and from chamber 58. This actuator comprises a cylindrical portion 64 slidable within a bore 65 extending into one side of housing 12 transversely to bore 18. Cylindrical portion 64 of actuator 63 carries a seal 66 which forms a chamber 67, a passage 68 connecting this chamber with chamber 58. A helical compression spring 69 is disposed between actuator 63 and a cover 71 so as to urge the actuator toward the right as seen in the figures. When in this position, an intermediate valve 72 carried by actuator 63 is disposed within passage 68 to close the connection between this passage and chamber 67.

Chamber 67 is adapted to be momentarily pressurized by some signal source, such as a three-way valve schematically indicated at 73 and having an inlet port 74, an exhaust port 75 and a working port 76 connected by a conduit 77 to chamber 67. Valve 73 may have a normal exhaust position, being shiftable to its supply position by a push-button controlled solenoid 78. It will be understood of course that other means could be used for shifting actuator 63 between its positions within the principles of the invention, and that means other than spring 69 could be used for urging the actuator toward its closed position.

In order to facilitate pressure reduction in end chambers 25 and 26 during operation, a passage 79 having a check valve 80 may be provided, this passage connecting conduit 77 with chamber 58 and bypassing intermediate valve 72. Check valve 80 will permit fluid flow from chamber 58 to control valve 73 but will prevent pressurization of chamber 58 other than through intermediate valve 72. Alternatively or additionally, bleed passages 80′ and 80″ leading to the atmosphere could be provided for chambers 25 and 26 respectively.

The outer end of valve 63 carries a detent 81 disposable within either groove 59 or 61 of spool 19. The length of detent 81 and position of valve 72 relative to the detent are such that upon opening movement of actuator 63, that is movement to the left, chambers 67 and 68 will be connected only after detent 81 has been withdrawn from groove 59 or 61. Similarly, upon rightward or closing movement of actuator 63, valve 72 will cut off the connection between chambers 67 and 68 before detent 81 enters either groove 59 or 61. It will become apparent from an operational description of the invention that because of this arrangement detent 81 will at no time be subjected to substantial lateral stresses which could subject it to excessive wear or failure during use.

A pair of alternately operable check valves 82 and 83 are provided for ensuring that chambers 25 and 26 are properly and adequately evacuated when spool 19 is shifted toward one or the other chamber. It will be learned from the operational description that evacuation of the proper chamber will normally be accomplished by shifting of control valve 73 to its exhaust position immediately before intermediate valve 72 reaches its closed position. To facilitate this action, spring 69 is preferably light, and passage 79 may be provided as described above. In the case of incompressible fluids however, it is possible that these chambers will not be sufficiently evacuated by the control valve alone. Check valves 82 and 83 are disposed at opposite ends of a bore 84 disposed within housing 12 alongside bore 18, bore 84 having valve seats 85 and 86 formed at opposite ends thereof. Valves 82 and 83 are of spherical shape and are disposed within chambers 87 and 88, respectively, these chambers being disposed at opposite ends of bore 84. Gasket 15 has a passage 89 connecting chamber 25 with chamber 87, and gasket 16 has a similar passage 91 connecting chamber 26 with chamber 88. Bore 84 is connected with exhaust passage 43, and a spacer 92 in the form of a rod is disposed within the bore 84 and engages valves 82 and 83 at its opposite ends. The length of spacer 92 is such that only one valve 82 or 83 will be able to engage its valve seat at any time. It will thus be seen that should chamber 25, for example, be pressurized and chamber 26 exhausted, valve 82 will engage its seat 85, thus holding valve 83 off its seat 86, so that as the spool 19 moves toward chamber 26 full evacuation of this chamber will be assured.

In operation, let us assume an initial condition as shown in FIGURE 1, in which actuating spool 19 is in its lower or exhaust position and control valve 73 is in its exhaust position with solenoid 78 deenergized. Upon energization of solenoid 78, control valve 73 will move to its supply position, applying pressure to chamber 67 and shifting detent actuator 63 to the left. Detent 81 will be withdrawn from groove 59 before valve 72 opens, and upon opening of valve 72 pressure will be applied to chamber 58 and will pass through passages 62 to chamber 49.

Since spool 19 is in its lower position, spring 57 will be holding valve 55 against seat 53, and the pressure will thus pass through bore 47 to chamber 26 and shift spool 19 upwardly into the position shown in FIGURE 2. This will close exhaust valve 45 and open inlet valve 29 to pressurize motor chamber 35. Since at this time pressure will be applied to chamber 88 through gasket passage 91, check valve 83 will engage its seat 86 and rod 92 will hold check valve 82 off its seat 85. An open connection will thus exist between chamber 25 and exhaust port 42 through gasket passage 89, chamber 87 and bore 84. Full shifting of spool 19 to the position of FIGURE 2 will thus be assured. It will be noted that even though the shifting of spool 19 to its upper position will cause spring 56 to be compressed, valve 55 will remain in the position shown in FIGURE 2 since chamber 49 will be pressurized while bore 52 is evacuated.

Upon deenergization of solenoid 78, valve 73 will shift to its exhaust position, and chamber 58 will be evacuated. This will cause chamber 26 to return to atmospheric pressure, although this chamber may not be completely evacuated if incompressible fluids are used. Fluid flow from chamber 26 will pass through bore 47, chamber 49 and passages 62.

Exhausting of chamber 67 will cause detent actuator 63 to shift to the right under the influence of spring 69, closing valve 72. Detent 81 will enter groove 61 to lock spool 19 in place. Ordinarily, spool 19 will be held in position by friction alone so that detent 81 will act only as a precautionary factor.

As chamber 49 is evacuated, spring 56 will urge shuttle valve 55 to its lower position, so that the parts will assume the condition shown in FIGURE 3. The parts will remain in this position until solenoid 78 is again energized, shifting control valve 73 to its supply position. This will again cause shifting of detent actuator 63 and withdrawal of detent 81 from groove 61. Further travel of detent actuator 63 will cause opening of intermediate valve 72 and application of pressure to chamber 58 and thus to shuttle valve chamber 49.

Since shuttle valve 55 is in the position of FIGURE 3, pressure will flow through bore 52 and into chamber 25. This will cause actuating spool 19 to be shifted downwardly to the position shown in FIGURE 4, thus closing inlet valve 29 and opening exhaust valve 45 to exhaust motor chamber 35. Pressure will also flow through gasket passage 89 to chamber 87, closing check valve 82 and shifting rod 92 to hold check valve 83 in its open position. This will ensure complete evacuation of chamber 26 as spool 19 shifts downwardly. Shuttle valve 55 will remain in the position of FIGURE 4 despite compression of spring 57 since pressure will be maintained in chamber 49.

Deenergization of solenoid 78 will cause shifting of control valve 73 to its exhaust position. This will cause chamber 25 to be exhausted through bore 52, chamber 49, passages 62, chamber 58, passage 68 and chamber 67, as well as bypass passage 79. Detent actuator 63 will shift to the right, closing intermediate valve 72 and permitting detent 81 to enter groove 59, spool 19 being in the position shown in FIGURE 4. The parts will thus attain the position shown in FIGURE 1 with shuttle valve 55 held against valve seat 53 in readiness for another cycle.

It will thus be seen that a novel and improved shiftable mechanism has been provided which is responsive to momentary actuation of a control valve to shift to alternate positions. The device is of extremely simple construction, has relatively few moving parts and requires a minimum of material and labor costs in its production. It is useable with either compressible or incompressible fluids and may be controlled in a number of different ways to cause alternate actuation of any of a variety of mechanisms.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. In combination, an actuating spool shiftable between first and second positions, first and second chambers pressurizable to shift said spool respectively to said first and second positions, a central chamber, means for alternately pressurizing and exhausting said central chamber, passageway means connecting said central chamber with said first and second chambers, valve means disposed in said passageway means and movable between a first position preventing fluid flow to said first chamber and a second position preventing fluid flow to said second chamber, and means responsive to movement of said spool to said first and second positions for urging said valve means toward its first and second positions, respectively.

2. In combination, an actuating spool shiftable between first and second positions, first and second chambers pressurizable to shift said spool respectively to said first and second positions, a central chamber, means for alternately pressurizing and exhausting said central chamber, passageway means connecting said central chamber with said first and second chambers, valve means disposed in said passageway means and movable between a first position preventing fluid flow to said first chamber and a second position preventing fluid flow to said second chamber, means responsive to movement of said spool to said first and second positions for urging said valve means toward its first and second positions respectively, and means responsive to pressurization of said central chamber with said valve means in either position for maintaining such valve means position against said urging means until said central chamber is exhausted.

3. In combination, an actuating spool shiftable between first and second positions, first and second chambers pressurizable to shift said spool respectively to said first and second positions, a central chamber, means for alternately pressurizing and exhausting said central chamber, passageway means connecting said central chamber with said first and second chambers, valve means disposed in said passageway means and movable between a first position preventing fluid flow to said first chamber and a second position preventing fluid flow to said second chamber, means responsive to movement of said spool to said first and second positions for urging said valve means toward its first and second positions respectively, and detent means for locking said spool in either position.

4. In combination, an actuating spool shiftable between first and second positions, first and second chambers pressurizable to shift said spool respectively to said first and second positions, a central chamber, means for alternately pressurizing and exhausting said central chamber, passageway means connecting said central chamber with said first and second chambers, valve means disposed in said passageway means and movable between a first position preventing fluid flow to said first chamber and a second position preventing fluid flow to said second chamber, means responsive to movement of said spool to said first and second posiitons for urging said valve means toward its first and second positions respectively, detent means for locking said spool in either position, and means for retracting said detent means before each pressurization of said central chamber.

5. In combination, an actuating spool shiftable between first and second positions, first and second chambers pressurizable to shift said spool respectively to said first and second positions, a central chamber, means for alternately pressurizing and exhausting said central chamber, passageway means connecting said central chamber with said first and second chambers, valve means disposed in said passageway means and movable between a first position preventing fluid flow to said first chamber and a second position preventing fluid flow to said second chamber, means responsive to movement of said spool to said first and second positions for urging said valve means toward its first and second positions respectively, and means responsive to pressurization of either of said first and second chambers for connecting the other chamber to exhaust.

6. In combination, an actuating spool shiftable between first and second positions, first and second chambers pressurizable to shift said spool respectively to said first and second positions, a central chamber, means for alternately pressurizing and exhausting said central chamber, passageway means connecting said central chamber with said first and second chambers, valve means disposed in said passageway means and movable between a first position preventing fluid flow to said first chamber and a second position preventing fluid flow to said second chamber, means responsive to movement of said spool to said first and second positions for urging said valve means toward its first and second positions respectively, means responsive to pressurization of said central chamber with said valve means in either position for maintaining such valve means position against said urging means until said central chamber is exhausted, detent means for locking said spool in either position, and means for retracting said detent means before each pressurization of said central chamber.

7. In combination, an actuating spool shiftable between first and second positions, first and second chambers pressurizable to shift said spool respectively to said first and second positions, a central chamber, means for alternately pressurizing and exhausting said central chamber, passageway means connecting said central chamber with said first and second chambers, valve means disposed in said passageway means and movable between a first position preventing fluid flow to said first chamber and a second position preventing fluid flow to said second chamber, means responsive to movement of said spool to said first and second positions for urging said valve means toward its first and second positions respectively, means responsive to pressurization of said central chamber with said valve means in either position for maintaining such valve means position against said urging means until said central chamber is exhausted, and means responsive to pressurization of either of said first and second chambers for connecting the other chamber to exhaust.

8. In combination, an actuating spool shiftable between first and second positions, first and second chambers pressurizable to shift said spool respectively to said first and second positions, a central chamber, means for alternately pressurizing and exhausting said central chamber, passageway means connecting said central chamber with said first and second chambers, valve means disposed in said passageway means and movable between a first position preventing fluid flow to said first chamber and a second position preventing fluid flow to said second chamber, means responsive to movement of said spool to said first and second positions for urging said valve means toward its first and second positions respectively, means responsive to pressurization of either of said first and second chambers for connecting the other chamber to exhaust, detent means for lacking said spool in either position, and means for retracting said detent means before each pressurization of said central chamber.

9. In a device for obtaining alternate shifting of a member between two positions in response to momentary movement of a control valve from an exhaust to a supply position, an actuating spool, first and second chambers at opposite ends of said spool, a central chamber within said spool and connected to the outlet of said control valve, first and second bores in said spool connecting said central chamber with said first and second chambers respectively, a shuttle valve in said central chamber, said shuttle valve being shiftable between a first position preventing fluid flow from said central chamber to said first chamber and a second position preventing fluid flow from said central chamber to said second chamber, and means responsive to movement of said spool to its first and second positions for urging said shuttle valve toward its first and second positions respectively.

10. The combination according to claim 9, said urging means comprising first and second springs in said first and second bores respectively connected to said shuttle valve, and stationary supports for the outer ends of said springs.

11. In a device for obtaining alternate shifting of a member between two positions in response to momentary movement of a control valve from an exhaust to a supply position, an actuating spool, first and second chambers at opposite ends of said spool, a central chamber within said spool and connected to the outlet of said control valve, first and second bores in said spool connecting said central chamber with said first and second chambers respectively, a shuttle valve in said central chamber, said shuttle valve being shiftable between a first position preventing fluid flow from said central chamber to said first chamber and a second position preventing fluid flow from said central chamber to said second chamber, means responsive to movement of said spool to its first and second positions for urging said shuttle valve toward its first and second positions respectively, a detent movable between an operative position to lock the spool in either of its positions and a retracted position, a detent actuator responsive to movement of said control valve to its supply position for retracting said detent, and an intermediate valve movable with said detent actuator and interposed between said control valve and said central chamber to prevent pressurization of said central chamber until said detent has moved to its retracted position.

12. In a device for obtaining alternate shifting of a member between two positions in response to momentary movement of a control valve from an exhaust to a supply position, an actuating spool, first and second chambers at opposite ends of said spool, a central chamber within said spool and connected to the outlet of said control valve, first and second bores in said spool connecting said central chamber with said first and second chambers respectively, a shuttle valve in said central chamber, said shuttle valve being shiftable between a first position preventing fliud flow from said central chamber to said first chamber and a second position preventing fluid flow from said central chamber to said second chamber, means responsive to movement of said spool to its first and second positions for urging said shuttle valve toward its first and second positions respectively, a detent movable between an operative position to lock the spool in either of its positions and a retracted position, a detent actuator responsive to movement of said control valve to its supply position for retracting said detent, an intermediate valve movable with said detent actuator and interposed between said control valve and said central chamber to prevent pressurization of said central chamber until said detent has moved to its retracted position, a passage connecting said central chamber and the outlet of said control valve and bypassing said intermediate valve, and a check valve in said bypass passage permitting flow only to said control valve.

13. In a device for obtaining alternate shifting of a member between two positions in response to momentary movement of a control valve from an exhaust to a supply position, an actuating spool, first and second chambers at opposite ends of said spool, a central chamber within said spool and connected to the outlet of said control valve, first and second bores in said spool connecting said central chamber with said first and second chambers respectively, a shuttle valve in said central chamber, said shuttle valve being shiftable between a first position preventing fluid flow from said central chamber to said first chamber and a second position preventing fluid flow from said central chamber to said second chamber, means responsive to movement of said spool to its first and second positions for urging said shuttle valve toward its first and second positions respectively, passageway means connecting said first and second chambers to exhaust, first and second check valves in said passageway means for preventing fluid flow from said first and second chambers respectively to exhaust, and means responsive to movement of either of said check valves to its closed position for shifting the other check valve to its open position.

14. In a device for obtaining alternate shifting of a member between two positions in response to momentary movement of a control valve from an exhaust to a supply position, an actuating spool, first and second chambers at opposite ends of said spool, a central chamber within said spool and connected to the outlet of said control valve, first and second bores in said spool connecting said central chamber with said first and second chambers respectively, a shuttle valve in said central chamber, said shuttle valve being shiftable between a first position preventing fluid flow from said central chamber to said first chamber and a second position preventing fluid flow from said central chamber to said second chamber, means responsive to movement of said spool to its first and second positions for urging said shuttle valve toward its first and second positions respectively, and a three-way valve carried by said spool and movable to a supply position in response to movement of said spool to its first position and an exhaust position in response to movement of said spool to its second position.

15. In combination, an actuating spool shiftable between first and second positions, first and second chambers pressurizable to shift said spool respectively to said first and second positions, a central chamber, means for alternately pressurizing and exhausting said central chamber, passageway means connecting said central chamber with said first and second chambers, valve means disposed in said passageway means and movable between a first position preventing fluid flow to said first chamber and a second position preventing fluid flow to said second chamber, and means responsive to movement of said spool to said first and second positions for urging said valve means into its first and second positions, respectively.

16. In combination, an actuating spool shiftable between first and second positions, first and second chambers pressurizable to shift said spool respectively to said first and second positions, a central chamber, means for alternately pressurizing and exhausting said central chamber, passageway means connecting said central chamber with said first and second chambers, valve means disposed in said passageway means and movable between a first position preventing fluid flow to said first chamber and a second position preventing fluid flow to said second chamber, means responsive to movement of said spool to said first and second positions for urging said valve means into its first and second positions respectively, and detent means for locking said spool in either position.

17. In a device for obtaining alternate shifting of a member between two positions in response to momentary movement of a control valve from an exhaust to a supply position, an actuating spool, first and second chambers at opposite ends of said spool, a central chamber within said spool and connected to the outlet of said control valve, first and second bores in said spool connecting said central chamber with said first and second chambers respectively, a shuttle valve in said central chamber, said shuttle valve being shiftable between a first position preventing fluid flow from said central chamber to said first chamber and a second position preventing fluid flow from said central chamber to said second chamber, and means responsive to movement of said spool to its first and second positions for urging said shuttle valve into its first and second positions respectively.

References Cited in the file of this patent
UNITED STATES PATENTS

| | | |
|---|---|---|
| 393,596 | Westinghouse | Nov. 27, 1888 |
| 896,211 | Jenkins | Aug. 18, 1908 |
| 2,098,936 | Armstrong | Nov. 16, 1937 |
| 2,584,229 | Sacchini | Feb. 5, 1952 |
| 2,792,020 | Lieser | May 14, 1957 |
| 2,859,735 | De Tirro et al. | Nov. 11, 1958 |